(12) United States Patent
Jeon et al.

(10) Patent No.: US 12,523,280 B2
(45) Date of Patent: Jan. 13, 2026

(54) CONTINUOUSLY VARIABLE TRANSMISSION DRIVE SYSTEM FOR ELECTRIC VEHICLES WITH IMPROVED DRIVING PERFORMANCE AND ENERGY EFFICIENCY

(71) Applicant: NTOP ENGINEERING INC., Incheon (KR)

(72) Inventors: Young Keun Jeon, Incheon (KR); Jong Hyeon Park, Seoul (KR); Dong Hwan Park, Anyang-si (KR)

(73) Assignee: NTOP ENGINEERING INC., Incheon (KR)

( * ) Notice: Subject to any disclaimer, the term of this patent is extended or adjusted under 35 U.S.C. 154(b) by 0 days.

(21) Appl. No.: 19/033,736

(22) Filed: Jan. 22, 2025

(65) Prior Publication Data

US 2025/0163998 A1  May 22, 2025

Related U.S. Application Data

(63) Continuation of application No. PCT/KR2024/008407, filed on Jun. 18, 2024.

(30) Foreign Application Priority Data

Aug. 1, 2023  (KR) .................. 10-2023-0100172

(51) Int. Cl.
*F16H 3/72* (2006.01)
*B60K 1/02* (2006.01)
(Continued)

(52) U.S. Cl.
CPC .......... *F16H 37/084* (2013.01); *F16H 3/728* (2013.01); *H02K 7/006* (2013.01); *H02K 7/116* (2013.01);
(Continued)

(58) Field of Classification Search
CPC ............... F16H 3/52; F16H 2200/2005; F16H 3/72–728; B60K 1/02
See application file for complete search history.

(56) References Cited

U.S. PATENT DOCUMENTS 9,797,479 B1 *  10/2017  Palfai .................... F16D 41/066
10,286,898 B2 *   5/2019  Ono ....................... B60K 6/383
(Continued)

FOREIGN PATENT DOCUMENTS

| JP | H06090546 A | 3/1994 |
| JP | 2016205488 A | 12/2016 |

(Continued)

OTHER PUBLICATIONS

International search report of PCT/KR2024/008407, Sep. 25, 2024, English transaltion.

*Primary Examiner* — Ernesto A Suarez
*Assistant Examiner* — Lillian T Nguyen
(74) *Attorney, Agent, or Firm* — STIP Law Group, LLC

(57) ABSTRACT

The invention of continuously variable transmission drive system for electric vehicles comprises a housing 210, a first motor 220, a second motor 230, a first gear assembly 240 including a sun gear 241 having a main input shaft 241a connected to a first motor 220, an inner ring gear 242 arranged around the sun gear 241, planetary gears 243 arranged between the sun gear 241 and the inner ring gear 242, and a carrier 244 having an output shaft 244a connected to the shafts of the planetary gears 243, and a second gear assembly 250 including a sub-drive gear 251 having a sub-input shaft 251a connected to a second motor 230, an outer ring gear 252 forming one body with the outer side of the inner ring gear 242, and an idler gear 253 transmitting the driving force of the second motor 230 to the outer ring gear 252.

4 Claims, 16 Drawing Sheets

(51) Int. Cl.
*F16H 37/08* (2006.01)
*H02K 7/00* (2006.01)
*H02K 7/116* (2006.01)

(52) U.S. Cl.
CPC ........ *B60K 1/02* (2013.01); *F16H 2200/0021* (2013.01); *F16H 2200/005* (2013.01)

(56) References Cited

U.S. PATENT DOCUMENTS

| | | | |
|---|---|---|---|
| 10,359,100 B2 * | 7/2019 | Mastie | B60K 17/352 |
| 11,400,807 B2 * | 8/2022 | Chopra | B60K 17/046 |
| 2017/0067549 A1 * | 3/2017 | Heiraas | F16H 35/10 |

FOREIGN PATENT DOCUMENTS

| | | | |
|---|---|---|---|
| JP | 2020020365 A | | 2/2020 |
| KR | 20110111894 A | | 10/2011 |
| KR | 102111472 B1 | | 5/2020 |
| KR | 102597706 B1 | | 11/2023 |

* cited by examiner

CONTINUOUSLY VARIABLE TRANSMISSION DRIVE SYSTEM FOR ELECTRIC VEHICLES WITH IMPROVED DRIVING PERFORMANCE AND ENERGY EFFICIENCY

CROSS-REFERENCE TO RELATED APPLICATIONS

This application is a Continuation of Application No. PCT/KR2024/008407, filed on Jun. 18, 2024, which in turn claims the benefit of Korean Patent Application No. 10-2023-0100172, filed on Aug. 1, 2023. The entire disclosures of all these applications are hereby incorporated by reference.

TECHNICAL FIELD

The present invention relates to a continuously variable transmission drive system for an electric vehicle, and more specifically, to a continuously variable transmission drive system for an electric vehicle with improved driving performance and energy efficiency, which reduces consumption of electric energy and improves driving performance by varying the rotational speed and torque of an output shaft according to the environment by using a gear assembly having two motors and a planetary gear train.

BACKGROUND ART

Internal combustion engines that generally use engines have the characteristic of low torque at low RPM, and accordingly, in the case of automobiles that use engines as a driving source, the engine must be driven at high RPM in order to implement high torque to overcome inertial resistance at the start. Accordingly, it is a well-known fact that fuel consumption is excessive on complex roads with repeated stop-and-go traffic, and fuel efficiency is rapidly reduced, and furthermore, the process generates excessive exhaust gas, which pollutes the environment.

Meanwhile, electric vehicles have been developed and are rapidly becoming widespread as a means of transportation using motors as a driving source. Electric vehicles use a continuously variable transmission drive system that is implemented by combining a motor as a driving source and a reducer as a single body.

Since the motor generates high torque even at low RPM, it does not have to be driven at excessive RPM even on complex roads with repeated stop-and-go traffic, thus minimizing energy consumption.

In addition, the motor can easily change the RPM by controlling the applied power, so there is no need to use a transmission with a complex structure, and thus the possibility of failure during operation can be reduced. In addition, since no exhaust gas is emitted during operation, it is certain that it will replace internal combustion engine vehicles in the future.

When these electric vehicles are to drive on steep roads or at high speeds, high-output motors are used to achieve high torque. However, in the case of high-output motors, a lot of electrical energy is basically consumed, which ultimately causes the electric vehicle's fuel efficiency to decrease. In addition, because high-output motors are large in size, the size of the reducer coupled with them also had to be larger than necessary, which led to an increase in the weight of electric vehicles and a decrease in energy efficiency. And the use of high gear ratios and excessive RPMs during high-speed driving caused a decrease in energy efficiency.

DISCLOSURE

Technical Problems

The present invention was created to solve the above problems, and the purpose of the present invention is to provide a continuously variable transmission drive system for an electric vehicle with improved driving performance and energy efficiency, which reduces consumption of electric energy and improves driving performance by changing the rotation speed and torque of a carrier output shaft in accordance with the road environment using the first and second motors.

Another object of the present invention is to provide a continuously variable transmission drive system for an electric vehicle with improved driving performance and energy efficiency, which can improve energy efficiency by selectively cutting off the power of a second motor through a gear selector.

Technical Solution

In order to achieve the above-described purpose, the present invention provides a continuously variable transmission drive system for an electric vehicle with improved driving performance and energy efficiency which is installed in a chassis 100 having wheels 110, 120 at the front and rear and supplies rotational driving force to the wheels by power supplied from a battery, comprising: a housing 210 fixed to the chassis 100; a first motor 220 installed on one side of the housing 210 and supplying rotational driving force; a second motor 230 installed on the other side of the housing 210 and supplying rotational driving force; a first gear assembly 240 including a sun gear 241 built into the housing 210 and having a main input shaft 241a connected to the rotational shaft of the first motor 220, an inner ring gear 242 arranged to surround the sun gear 241 in a circumferential direction, a plurality of planetary gears 243 arranged between the sun gear 241 and the inner ring gear 242, and a carrier 244 having an output shaft 244a protruding outward from the housing 210 on the opposite side of the main input shaft 241a and connected to the rotational shafts of the plurality of planetary gears 243; and a second gear assembly 250 including a sub-drive gear 251 built into the housing 210 and having a sub-input shaft 251a connected to the rotational axis of the second motor 230, an outer ring gear 252 forming one body with the outer side of the inner ring gear 242, and an idler gear 253 transmitting the rotational driving force of the second motor 230 to the outer ring gear 252.

In the present invention, a gear shifter 260 is further included, which is installed in the housing 210 and selectively rotates or stops the rotation of the idler gear 253.

In the present invention, the gear shifter 260 includes: a plurality of dog grooves 261 formed in a cylindrical shape centered on the surface of the idler gear 253; a spline fixed shaft 262 which is fixed to the second housing 212 and has a rotation support groove 262a formed at the tip thereof in which a rotation axis 253a of the idler gear 253 is rotatably supported; a detachable ring 263 which moves forward and backward while not rotating relative to the spline fixed shaft 262; a dog tooth 264 formed on the front surface of the detachable ring 263 and which is detachable from the dog groove 261; and a selector 265 which moves the detachable ring 263 forward and backward so that the dog tooth 264 is coupled to or detached from the dog groove 261.

In the present invention, the detachable ring 263 further includes a mover cap 263a that rotates while maintaining a state of being connected to the selector 265.

In the present invention, the selector 265 includes a Y fork 266 having a pair of fork projections 266c formed at one end to fit into a ring groove 263c of the mover cap 263a, a lever shaft 267 formed at a fork lever 266b of the Y fork 266 and supported by a lever shaft support wing 212f formed at the second housing 212, a fork bearing 268 installed at an end of the fork lever 266b, and an operating rod 269 coupled to the fork bearing 268 and fit into a rod hole 212g of the second housing 212 and protruding outward from the housing 210.

In the present invention, the housing 210 includes a first housing 211 and a second housing 212 that are coupled to each other; the first and second housings 211, 212 have first and second inner fitting recesses 211a, 212a formed on the lower side of the inner surface facing each other and into which the first and second inner bearings 245, 246 of the first gear assembly 240 are fitted, first and second outer fitting recesses 211b, 212b formed on the outer side of the first and second inner fitting recesses 211a, 212a and into which the outer bearings 247 of the first gear assembly 240 are fitted, and an upper fitting recess 211c, 212c formed on the upper side and into which the upper bearing 256 of the second gear assembly 250 is fitted; wherein, a shaft coupling recess 212e to which the spline fixing shaft 262 of the gear shifter 260 is fixed, a pair of lever shaft support wings 212f on which the lever shaft 267 of the gear shifter 260 is supported, and a rod hole 212g formed between the pair of lever shaft support wings 212f and into which the operating rod 269 of the gear shifter 260 is fitted so as to be able to move forward and backward are formed between the upper fitting recess 212c and the second outer fitting recess 211b in the second housing 212.

Advantageous Effect

According to the present invention, the rotation speed and torque value at the output shaft 244a can be freely varied by the organic coupling relationship between the first and second motors 230, 230 and the first and second gear assemblies 240, 250, and accordingly, the electric vehicle can be driven at low or high speed on a general road, the electric vehicle can be driven with high torque on a steep road, and a continuously variable gear shift without any gear shift shock is possible.

In addition, the gear shifter 260 can physically fix the idler gear 253 so that it does not rotate, and in this case, when the power supplied to the second motor 230 is cut off, the electric energy only operates the first motor 220, which results in the relatively extended driving distance of the electric vehicle.

In addition, by using two first and second motors 220230 with smaller outputs than the single motor used in conventional electric vehicles, the size and weight of the continuously variable transmission drive system 200 can be reduced, thereby making it possible to reduce the weight of the electric vehicle and further reduce the electric energy consumed.

And by increasing the speed by using two motors, the electric energy consumed by the electric vehicle can be further reduced by using only the optimal torque, that is, the optimal current, of the first and second motors 220, 230 even at high speeds.

DESCRIPTION OF EMBODIMENTS

Hereinafter, a continuously variable transmission drive system for an electric vehicle with improved driving performance and energy efficiency according to the present invention will be described in detail with reference to the attached drawings.

Hereinafter, the terms "upper" or "on" may include not only things that are directly above in contact but also things that are above in a non-contact manner. The terms first, second, etc. may be used to describe various components, but the components should not be limited by the terms. The terms are used only for the purpose of distinguishing one component from another. The singular expression includes the plural expression unless the context clearly indicates otherwise. Also, when a part is said to "include" a component, this does not exclude other components unless specifically stated otherwise, but rather means that it can further include other components. Also, the terms " . . . section", "module", etc. described in the specification mean a unit that processes at least one function or operation.

Figure 1:
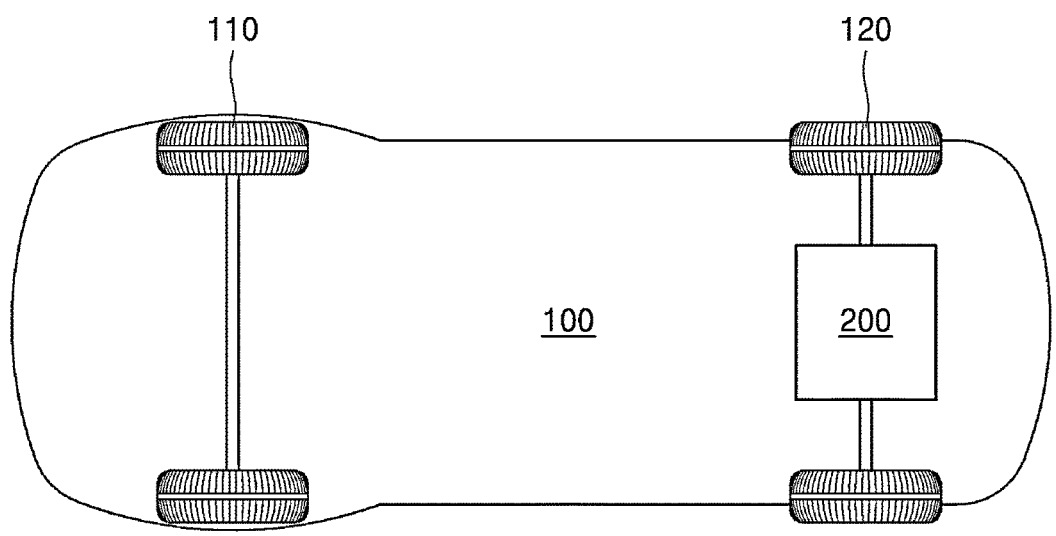
FIG. 1 is a schematic drawing of a continuously variable transmission drive system for an electric vehicle with improved driving performance and energy efficiency according to the present invention.
Figure 2:
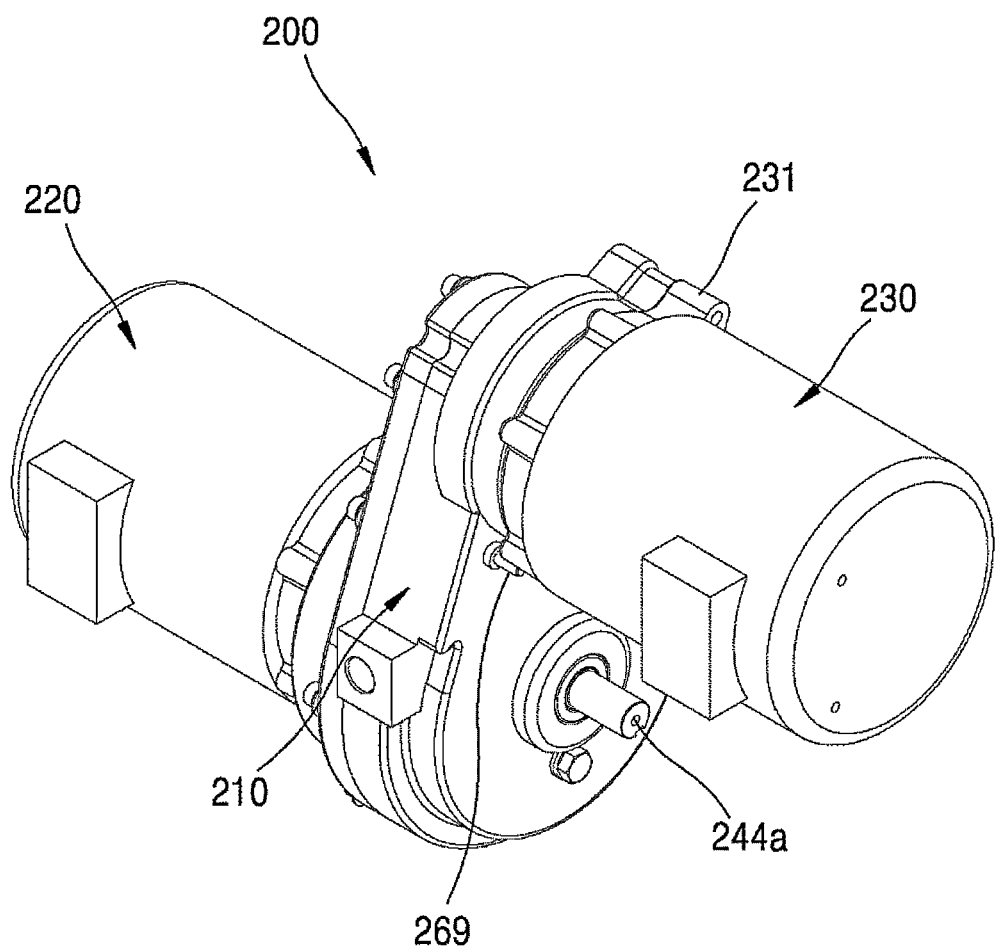
FIG. 2 is a perspective view illustrating an excerpt of a continuously variable transmission drive system installed in the chassis of FIG. 1.
Figure 3:
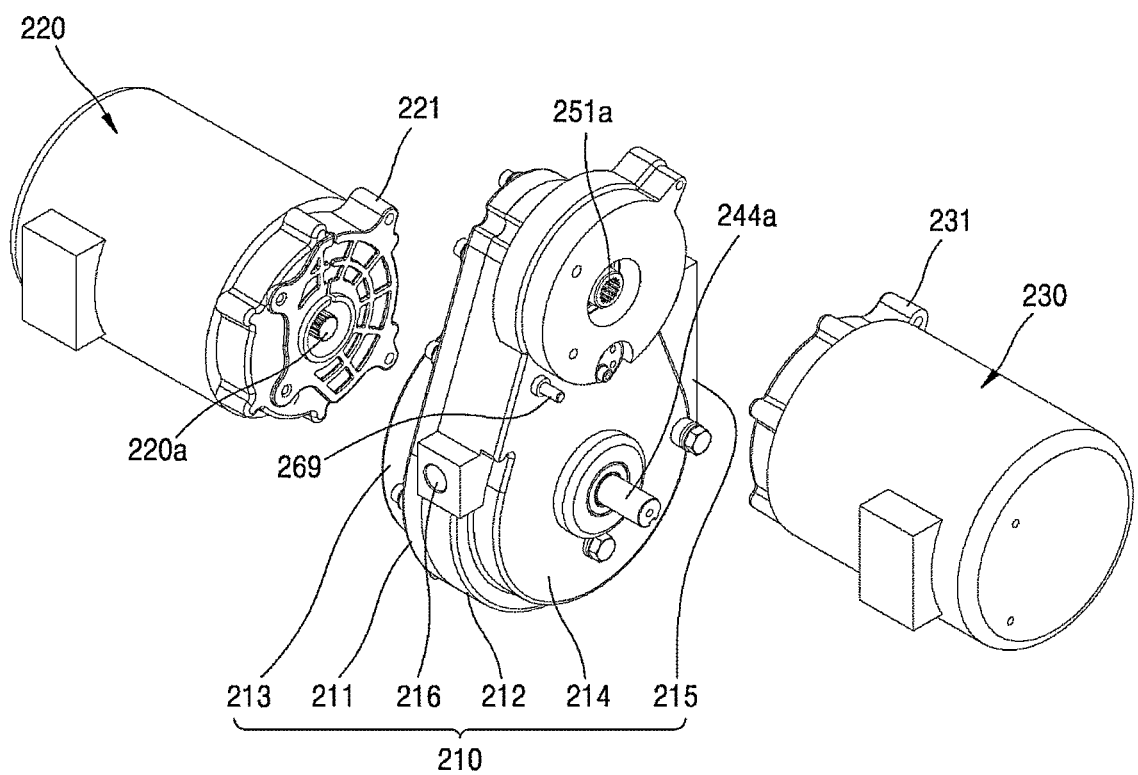
FIG. 3 is a perspective view showing the first and second motors disassembled from both sides of the housing of FIG. 2.
Figure 4:
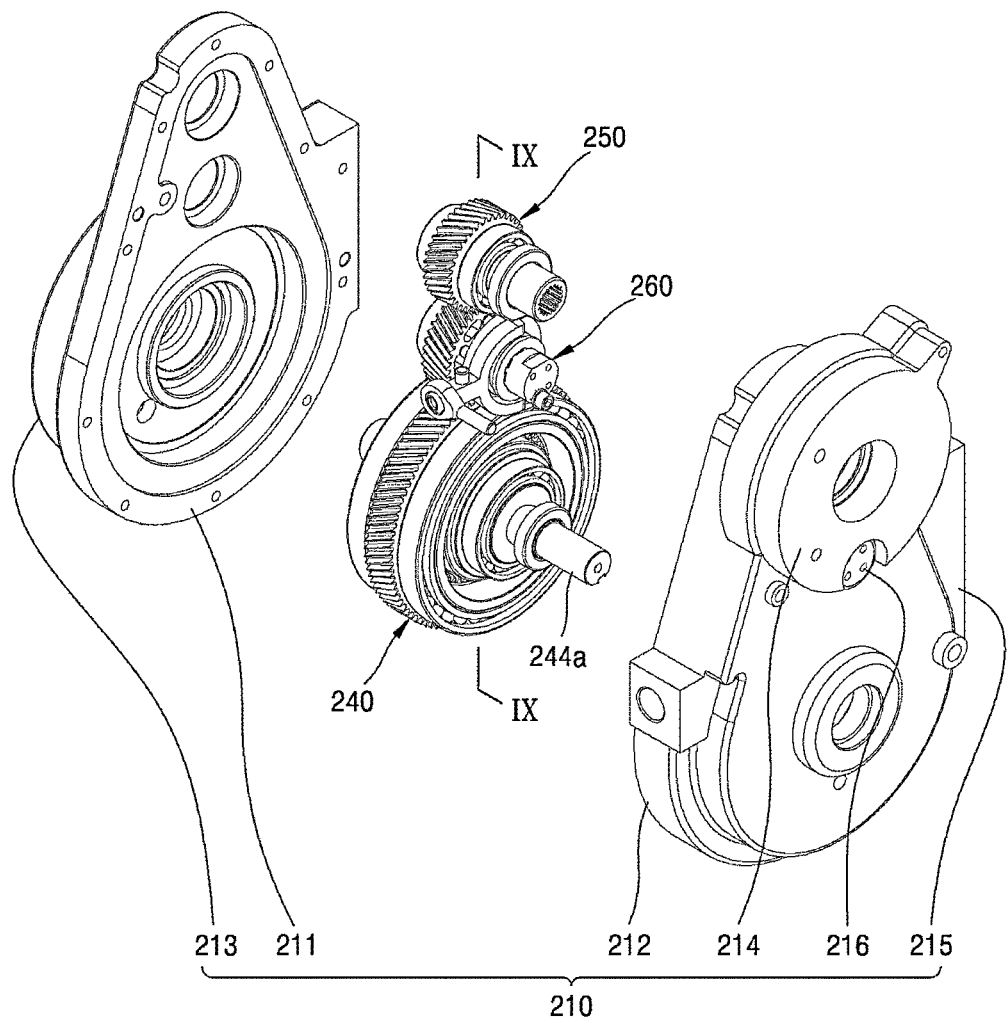
FIG. 4 is a perspective view of the first and second gear assemblies and gear shifter installed in the housing of FIG. 3.

FIG. 1 is a schematic drawing of a continuously variable transmission drive system for an electric vehicle with improved driving performance and energy efficiency according to the present invention, FIG. 2 is a perspective view illustrating an excerpt of a continuously variable transmission drive system installed in the chassis of FIG. 1, FIG. 3 is a perspective view illustrating first and second motors disassembled from both sides of the housing of FIG. 2, and FIG. 4 is a perspective view of first and second gear assemblies and a gear selector installed in the housing of FIG. 3.

As described above, the continuously variable transmission drive system for an electric vehicle with improved driving performance and energy efficiency according to the present invention is installed in a chassis 100 having wheels 110, 120 installed at the front and rear, and supplies rotational driving force to the wheels by power supplied from a battery not shown. In this embodiment, the continuously variable transmission drive system for an electric vehicle is exemplified as being directly or indirectly connected to the rear wheels 120 to supply rotational driving force.

The continuously variable transmission drive system for an electric vehicle of the present invention comprises: a housing 210 fixed to a chassis 100; a first motor 220 installed on one side of the housing 210 and supplying rotational driving force; a second motor 230 installed on the other side of the housing 210 and supplying rotational driving force; a first gear assembly 240 including a sun gear 241 built into a housing 210 and having a main input shaft 241a connected to the rotational shaft of a first motor 220, an inner ring gear 242 arranged circumferentially surrounding the sun gear 241, a plurality of planetary gears 243 arranged between the sun gear 241 and the inner ring gear 242, and an output shaft 244a protruding outward from the housing 210 on the opposite side of the main input shaft 241a, and a carrier 244 having an output shaft 244a protruding outward from the housing 210 on the opposite side of the main input shaft 241a and connected to the rotational shafts of the plurality of, for example, three planetary gears 243, a second gear assembly 250 including a sub-drive gear 251 built into a housing 210 and having a sub-input shaft 251a connected to the rotational shaft of a second motor 230, an outer ring gear 252 forming one body with the outer side of an inner ring gear 242, and an idler gear 253 transmitting the rotational driving force of the second motor 230 to the outer ring gear 252; and a gear shifter 260 installed in the housing 210 to selectively rotate or stop the rotation of the idler gear 253.

A first motor bracket 221 is coupled to the tip of the first motor 220 to secure the first motor 220 to one side of the housing 210, and a second motor bracket 231 is coupled to the tip of the second motor 230 to secure the second motor 230 to the other side of the housing 210.

The first gear assembly 240 reduces the rotation speed of the first motor 220 applied through the main input shaft 241 to output increased torque from the output shaft 244a. The second gear assembly 250 transmits the rotational driving force of the second motor 230 to the first gear assembly 240, thereby changing the rotational speed of the output shaft 244a or varying the torque. That is, the rotational driving force of the second motor 230 changes the rotational speed of output shaft 244a or varies the torque through the outer ring gear 252 of the second gear assembly 250 and the inner ring gear 242 of the first gear assembly 240.

Figure 5:
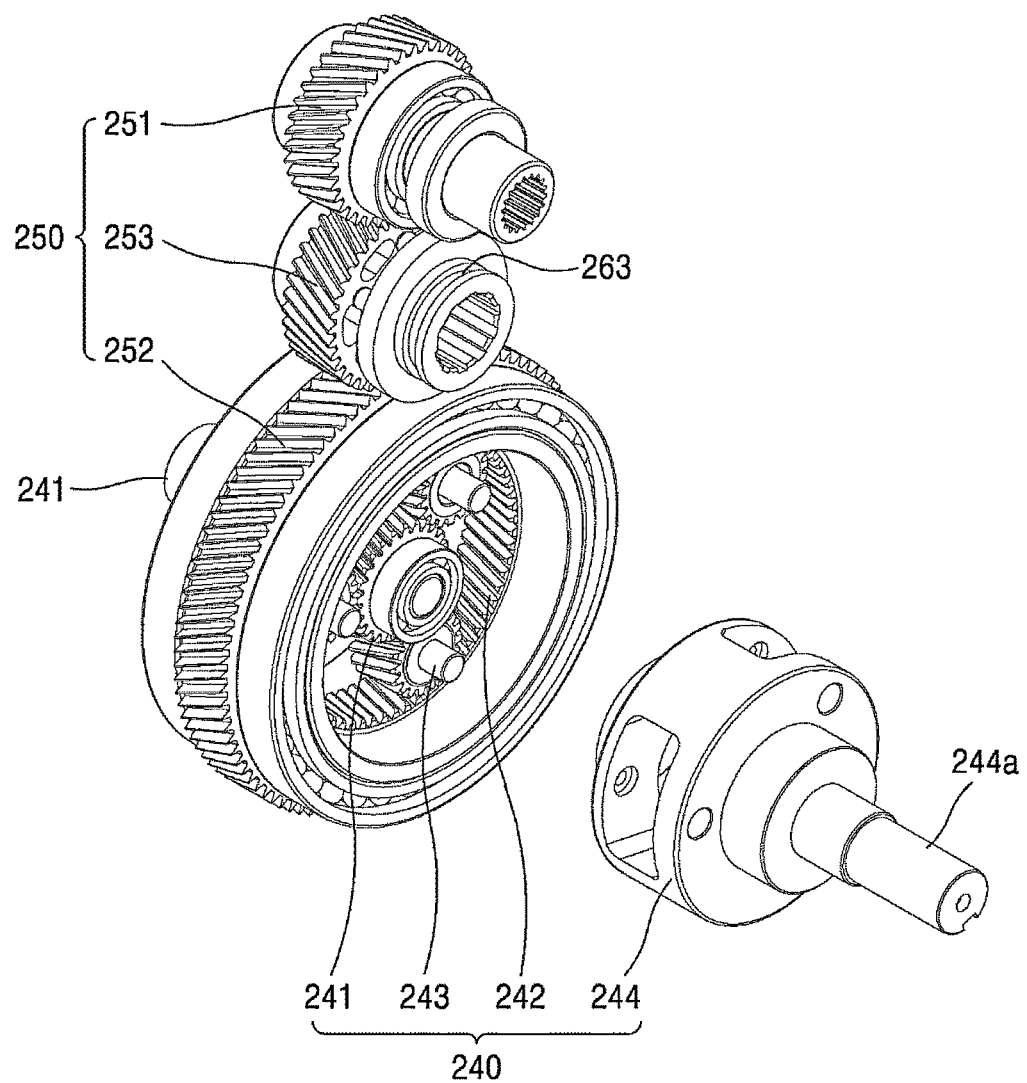
FIG. 5 is a perspective view for explaining the specific configuration of the first and second gear assemblies of FIG. 4.
Figure 8:
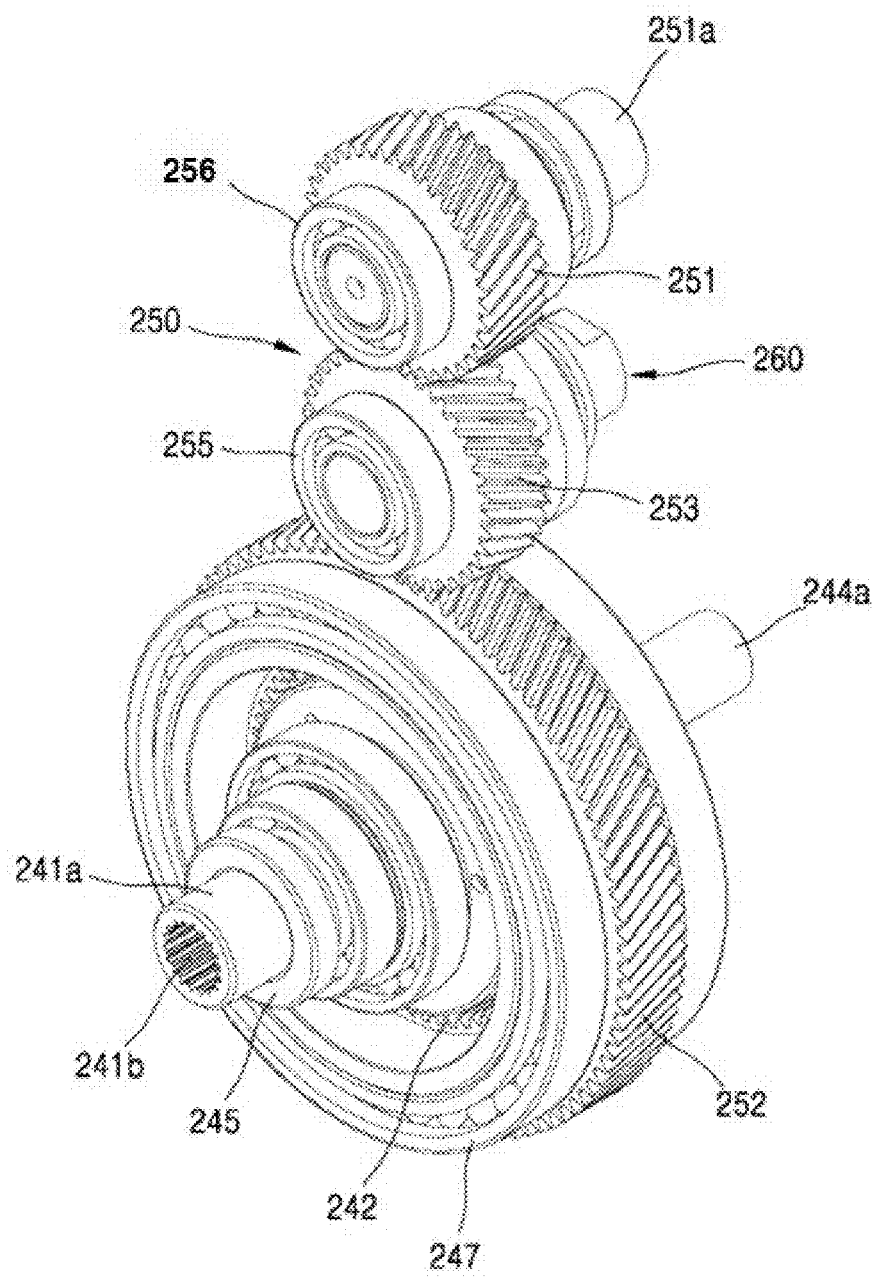
FIG. 8 is a perspective view of the first and second gear assemblies of FIG. 7 viewed from opposite directions.

FIG. 5 is a perspective view for explaining the specific configuration of the first and second gear assemblies of FIG. 4. On the outer surface of the rotation shaft 220a of the first motor, as shown in FIG. 3, a number of protrusions are formed, and on the inner surface of the coupling groove 241b of the main input shaft 241a, as shown in FIG. 8, a spline groove that meshes with the rotation shaft 220a of the first motor is formed, so that they can be coupled without relative rotation.

The planetary gear 243 meshes with the sun gear 241 on the inside of the inner ring gear 242 and revolves around the sun gear 241 when the sun gear 241 rotates. That is, the planetary gear 243 revolves around the sun gear 241 on the inside of the inner ring gear 242 that is not fixed to the housing 210.

The carrier 244 is simultaneously connected to the rotation shafts of a plurality of planetary gears 243, thereby rotating the output shaft 244a at the revolution speed of the rotating planetary gears 243. The output shaft 244a is directly or indirectly connected to the rear wheel 120 and transmits a rotational driving force that rotates the rear wheel 120.

By means of this first gear assembly 240, the rotational driving force of the first motor 220 rotates the sun gear 241 through the main input shaft 241a, and the rotated sun gear 241 rotates the carrier 244 with reduced speed while rotating a plurality of planetary gears 243, and the torque increased during the reduced rotating process is output through the output shaft 244a and transmitted to the rear wheels 120 of the electric vehicle to drive. That is, the first gear assembly 240 includes a planetary gear train composed of a sun gear 241 coupled with the rotational shaft of the first motor 220, an inner ring gear 242, a plurality of planetary gears 243 and a carrier 244, thereby decelerating the rotational speed of the first motor 220 so that the output shaft 244a can rotate with a large torque.

The sub-input shaft 251a of the second gear assembly 250 is directly connected to the rotational axis of the second motor 230 and transmits the rotational driving force of the second motor 230 to the sub-driving gear 251 to rotate it.

The outer ring gear 252 forms a single body with the inner ring gear 242 on the outside of the inner ring gear 242. Accordingly, the outer ring gear 252 rotates together with the inner ring gear 242 when the inner ring gear 242 rotates by the planetary gear 243 that meshes with the sun gear 241 and revolves.

The idler gear 253 is installed between the sub-drive gear 251 and the outer ring gear 252 and transmits the rotational driving force of the second motor 230 transmitted to the sub-drive gear 251 to the outer ring gear 252. In other words, the idler gear 253 acts as a medium that transmits the rotational driving force of the second motor 230 to the outer ring gear 252.

By means of this second gear assembly 250, the rotational driving force of the second motor 230 applied to the sub-drive gear 251 is transmitted to the outer ring gear 252 through the idler gear 253. At this time, the rotating outer ring gear 252 rotates the inner ring gear 242, thereby varying the rotational speed of a plurality of planetary gears 243 and at the same time adding the torque applied from the first motor 230, and accordingly, the rotational speed of the output shaft 244a as well as the torque value can be freely varied. That is, by the mutually organic relationship of the first and second motors 220, 230 and the first gear assembly 240 having a planetary gear train, and the second gear assembly 250 having an idler gear 253 transmitting the rotational driving force of the second motor 230, a stepless speed change that varies the rotational speed and torque output to the output shaft 244a becomes possible.

Figure 6:
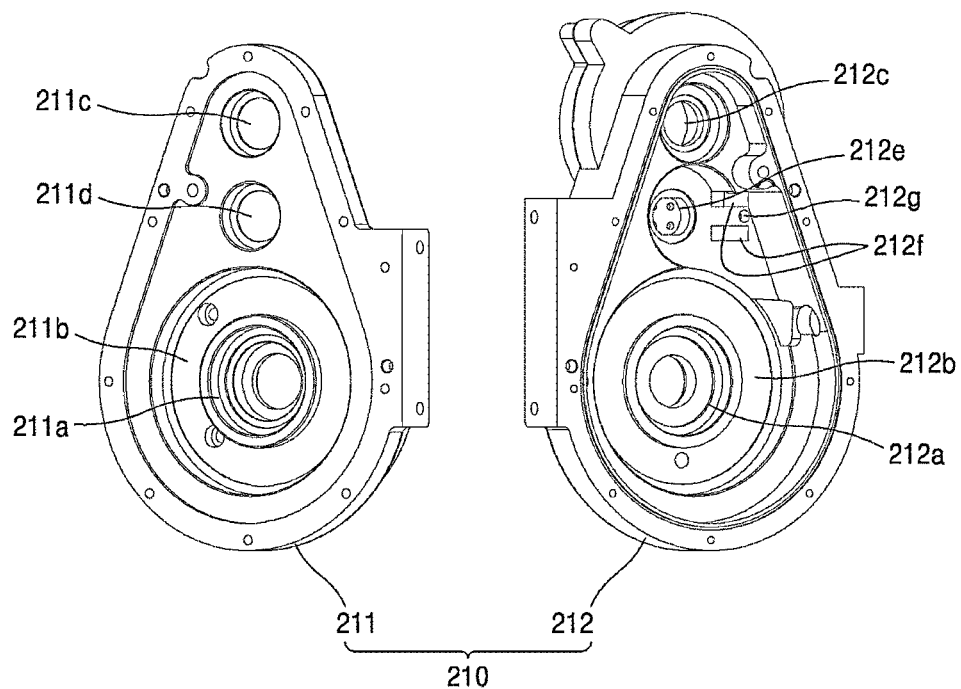
FIG. 6 is a drawing for explaining the housing of FIG. 4.

FIG. 6 is for explaining the housing of FIG. 4. The housing 210 includes a first housing 211 and a second housing 212 that are coupled to each other, a first housing stage 213 formed on the outside of the first housing 211 and to which a first motor bracket 221 coupled to the tip of a first motor 220 is fixed, a second housing stage 214 formed on the outside of the second housing 212 and to which a second motor bracket 231 coupled to the tip of a second motor 230 is fixed, a housing fixing member 215 for fixing the first and second housings 211, 212 to an automobile chassis 100, and an oil inlet 216 for injecting oil into the inside.

The first housing 211 and the second housing 212 form a space in which the first and second gear assemblies 240, 250 and the gear shifter 260 are built when combined. The first and second housings 211, 212 are formed on the lower side of the inner surface facing each other and have first and second inner fitting recesses 211a, 212a in which the first and second inner bearings 245, 246 of the first gear assembly 240 are fitted, and first and second outer fitting recesses 211b, 212b are formed on the outer side of the first and second inner fitting recesses 211a, 212a and in which the outer bearings 247 of the first gear assembly 240 are fitted. It includes an upper fitting recess 211c, 212c formed on the upper side and into which the upper bearing 256 of the second gear assembly 250 is fitted.

In the first housing 211, an intermediate recess 211d is formed between the upper fitting recess 211c and the first outer fitting recess 211b, into which the idler bearing 255 of the second gear assembly 250 is fitted and fixed.

In the second housing 212, between the upper fitting recess 212c and the second outer fitting recess 211b, a shaft coupling recess 212e to which a spline fixing shaft 262 is fixed, a pair of lever shaft support wings 212f on which a lever shaft 267 forming a selector 265 to be described later is supported, and a rod hole 212g formed between the pair of lever shaft support wings 212f and into which an operating rod 269 is inserted so as to be able to move forward and backward is formed.

The first and second housing stages 213, 214 are formed stepwise on the outside of the first and second housings 211, 212 and provide a space for fixing the first and second motors 220, 230, and a plurality of screw holes into which bolts penetrating the first and second motor brackets 221, 231 are fastened are formed to fix the first and second motors 220, 230 to the first and second housing stages 213, 214.

The oil injection port 216 allows oil to be injected into the housing 210. The oil injected into the housing 210 reduces frictional resistance so that the first and second gear assemblies 240, 250 and the gear shifter 260 can operate smoothly.

By means of this housing 210, the first and second gear assemblies 240,250, the gear shifter 260, and the first and second motors 220230 can be combined into one body, and at the same time, a structural mechanism can be implemented that can organically connect the first and second motors 220, 230, the first and second gear assemblies 240, 250, and the gear shifter 260.

Figure 7:
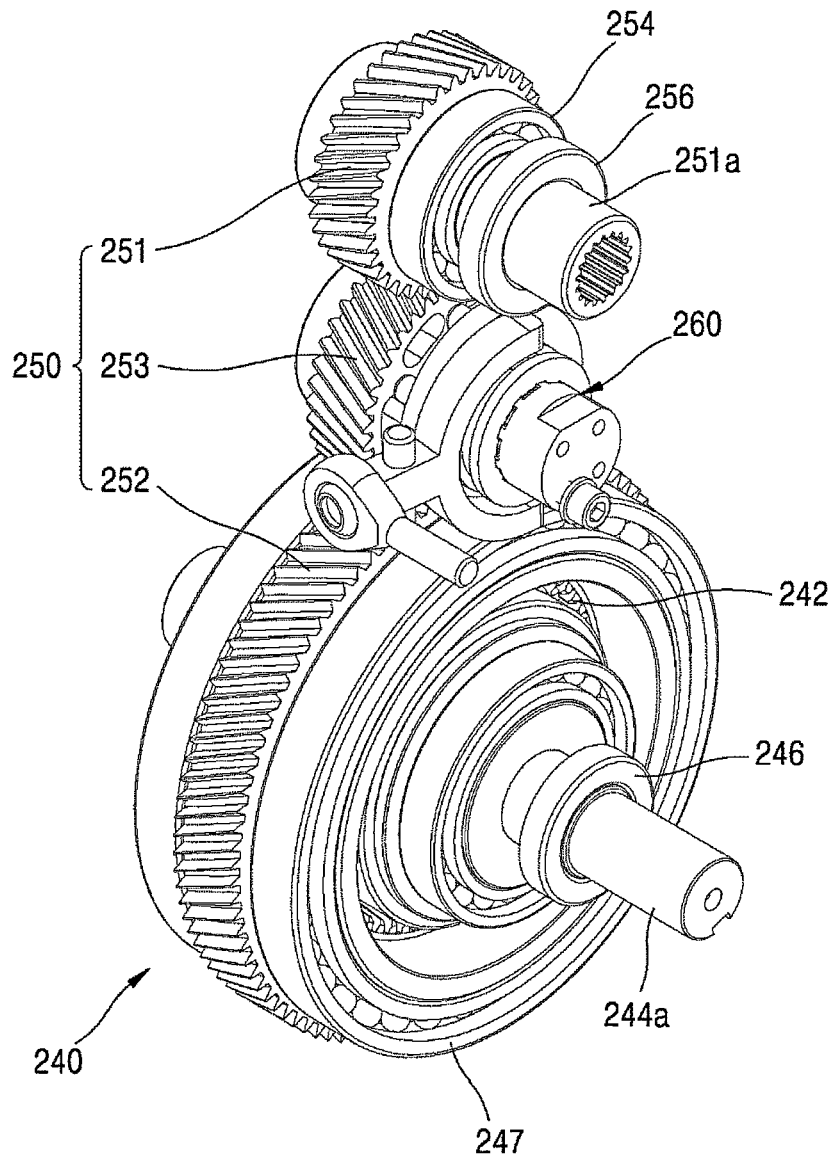
FIG. 7 is a perspective view for explaining the bearings employed in the first and second gear assemblies of FIG. 4.

FIG. 7 is a perspective view for explaining bearings employed in the first and second gear assemblies of FIG. 4, and FIG. 8 is a perspective view of the first and second gear assemblies of FIG. 7 viewed from the opposite direction.

The first gear assembly 240 is coupled to the main input shaft 241a and includes a first inner bearing 245 coupled to the first inner fitting recess 211a of the first housing 211 to rotatably support the sun gear 241, a second inner bearing 246 coupled to the carrier to which the output shaft 244a is connected and coupled to the second inner fitting recess 212a of the second housing 212 to rotatably support the carrier 244, and an outer bearing 247 coupled to the inner ring gear 242 on both sides and fitted to a first and second outer fitting recesses 211b, 212b formed stepwise on the outer sides of the first and second inner fitting recesses 211a, 212a to rotatably support the inner ring gear 242. Accordingly, a structural mechanism can be implemented in which the first inner bearing 245 is fitted to the first inner fitting recess 211a to rotatably support the sun gear 241, and the second inner bearing 246 is fitted to the second inner fitting recess 212a to rotatably support the carrier 244.

The outer bearing 247 is fitted to the first and second outer fitting recesses 211b, 212b to rotatably support the inner ring gear 242 and the outer ring gear 252, so that a structural mechanism can be implemented that can rotatably support the inner ring gear 242 and the outer ring gear 252 inside the first and second housings 211, 212 without forming a hole penetrating the first and second housings 211, 212.

Meanwhile, the second gear assembly 250 further includes an upper bearing 256 that is coupled to the sub-input shaft 251a and is fitted to the upper fitting recesses 211c, 212c of the first and second housings 211, 212 to rotatably support the sub-driving gear 251. Since the upper bearing 256 is fitted to the upper fitting recesses 211c, 212c to rotatably support the sub-driving gear 251, a structural mechanism that can rotatably support the sub-driving gear 251 inside the first and second housings 211, 212 can be implemented without forming a hole penetrating the first and second housings 211, 212.

These first and second gear assemblies 240, 250 are coupled with the first and second motors 220, 230, so that the torque of the output shaft 244a becomes the sum of the torque of the first motor 220 and the torque of the second motor 230, the rotation speed RPM of the output shaft 244a becomes the sum of the rotation speed RPM of the first motor 220 and the rotation speed RPM of the second motor 230, and the gear ratio of the output shaft 244a is determined by the torque of the first motor 220 and the torque of the second motor 230.

Figure 9:
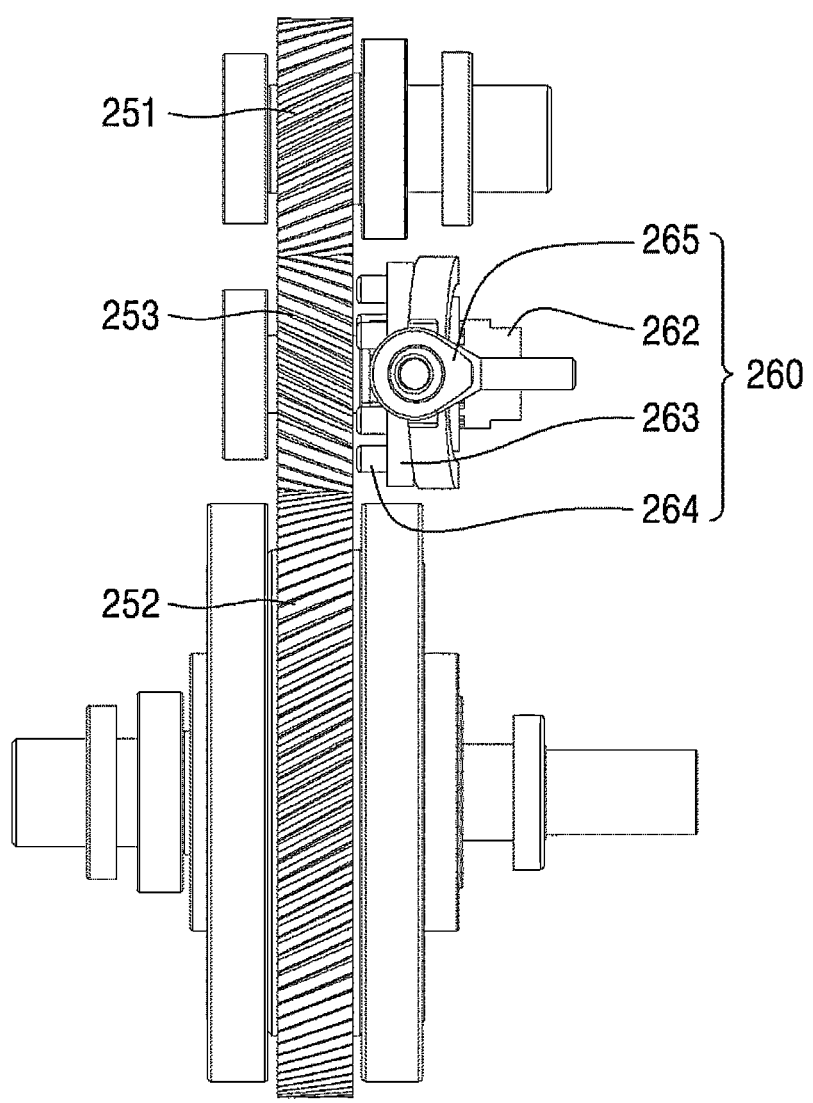
FIG. 9 is a cross-sectional view along line IX-IX of FIG. 4.
Figure 10:
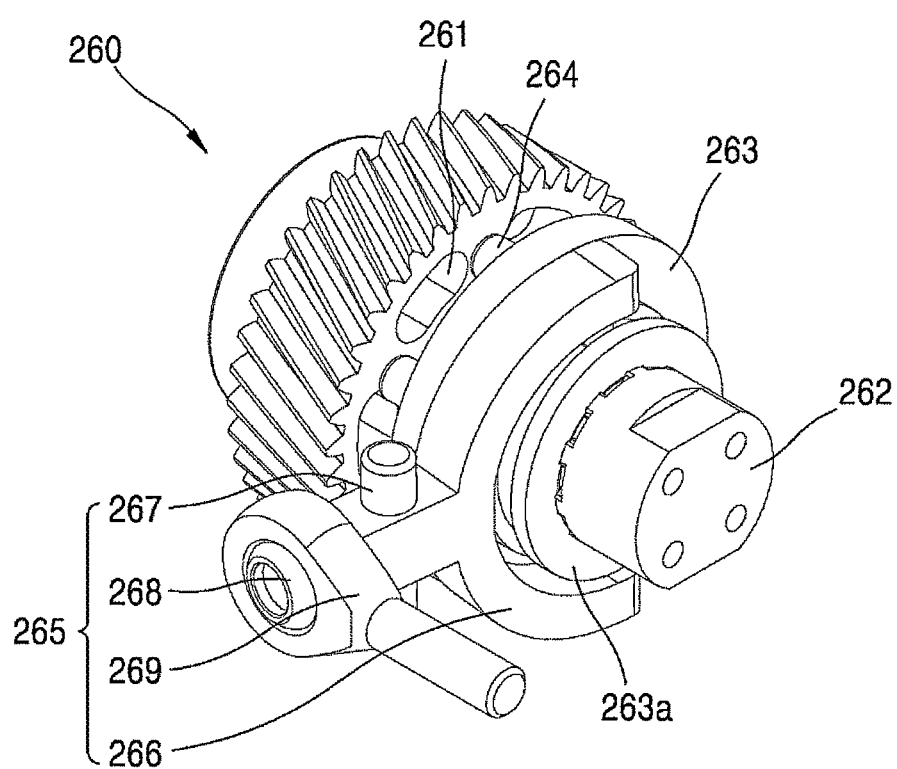
FIG. 10 is a perspective view showing the gear shifter of FIG. 9.
Figure 11:
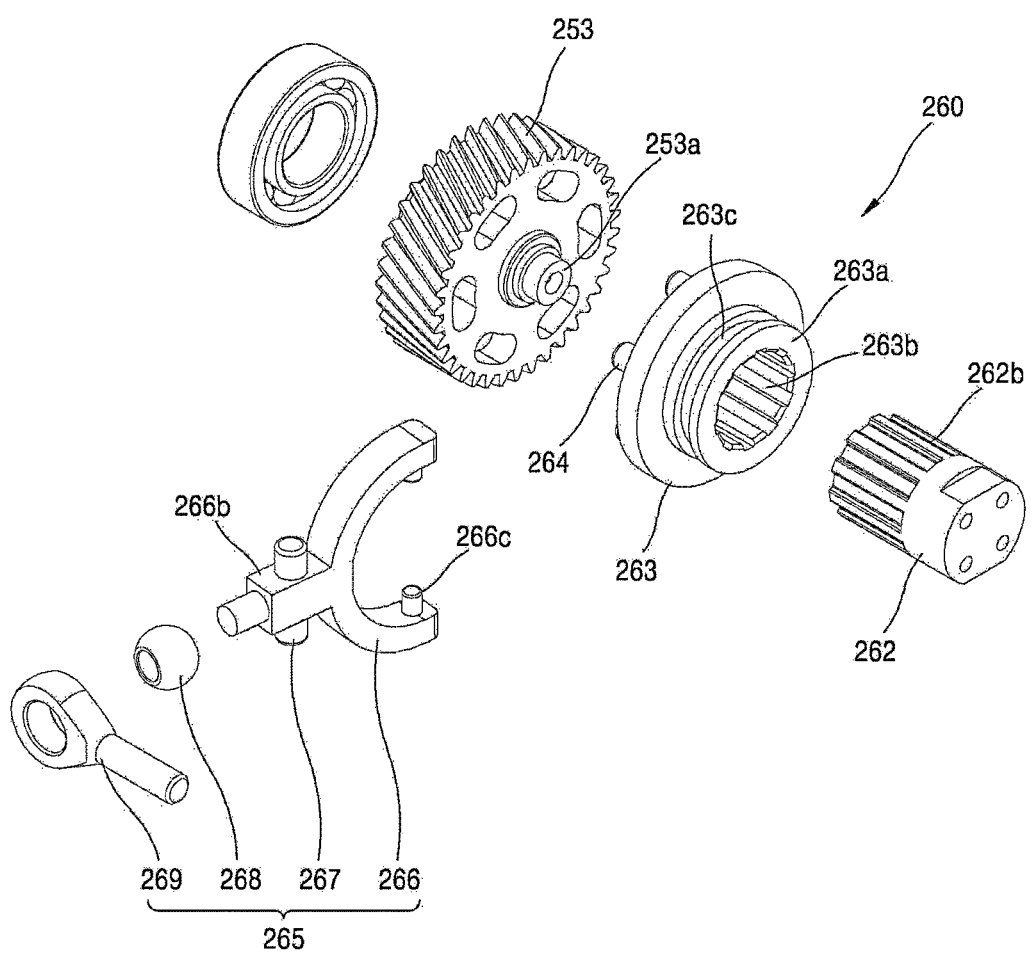
FIG. 11 is an exploded perspective view of the gear selector of FIG. 10.
Figure 12:
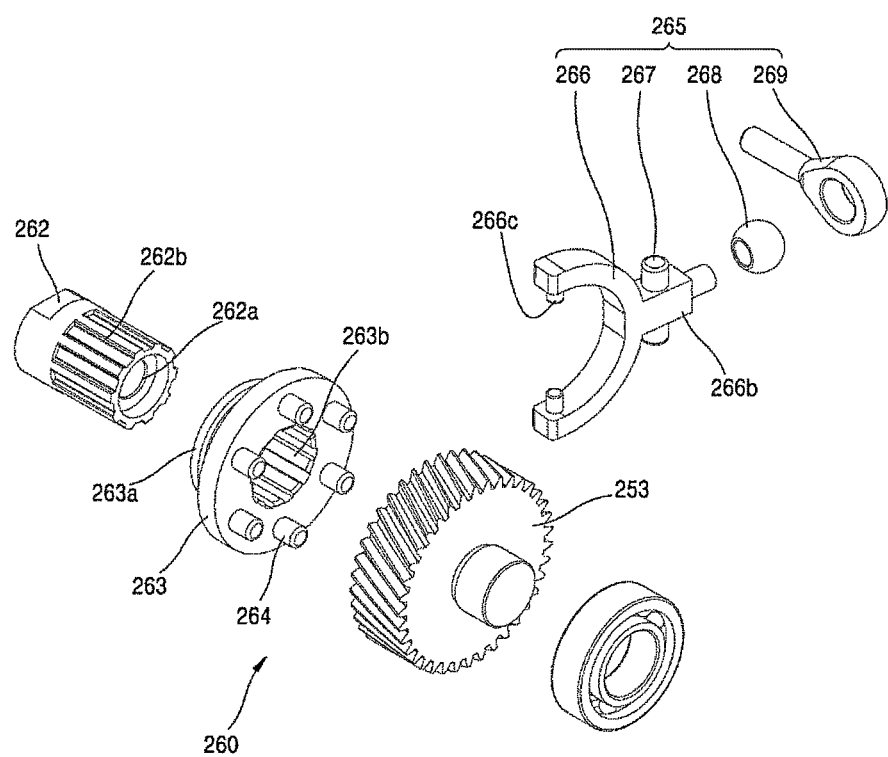
FIG. 12 is a drawing of the disassembled gear unit of FIG. 11 viewed from another direction.
Figure 13:
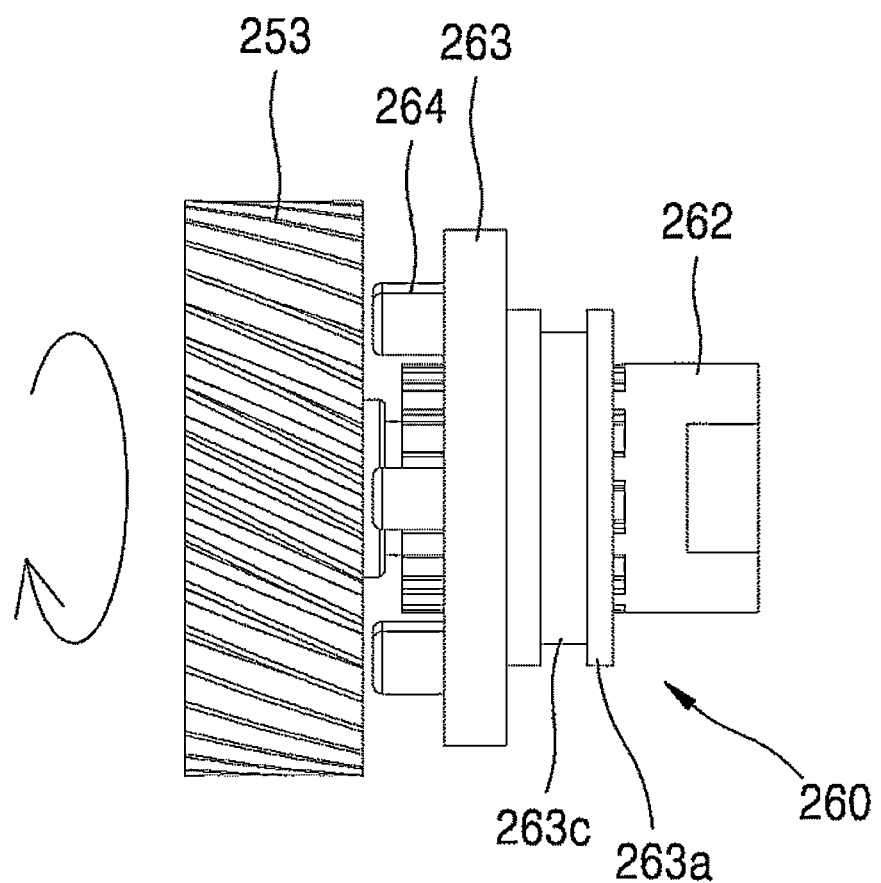
FIG. 13 is a drawing for explaining that the idler gear rotates when the dog tooth is separated from the dog groove in the gear disconnector of FIG. 9.
Figure 14:
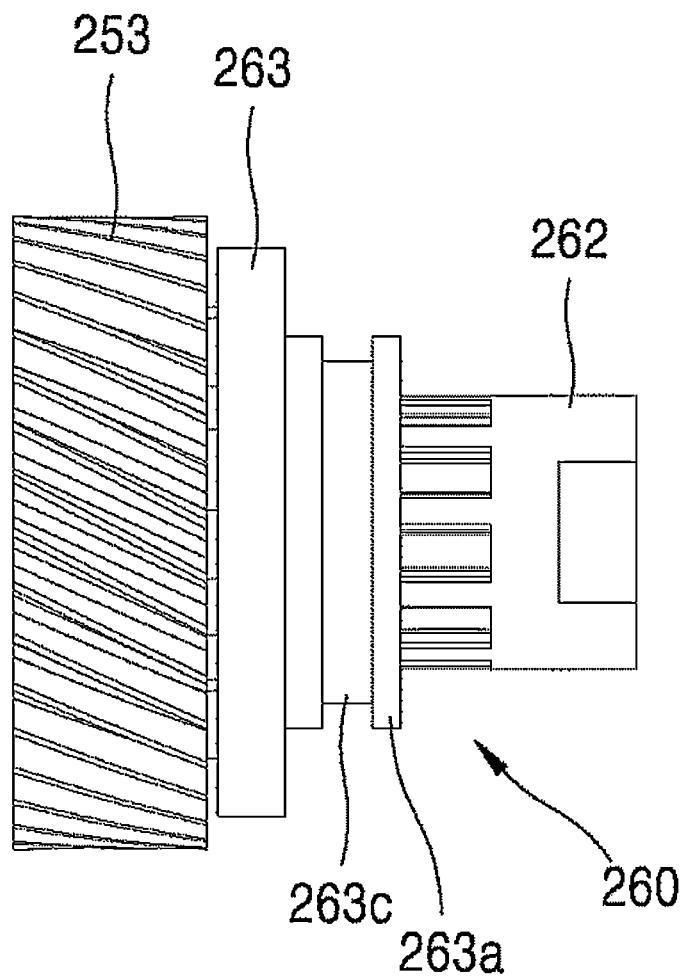
FIG. 14 is a drawing for explaining that the idler gear stops when the dog teeth are engaged with the dog groove in the gear changer of FIG. 13.

FIG. 9 is a cross-sectional view taken along the line IX-IX of FIG. 4, FIG. 10 is a perspective view illustrating the gear disconnector of FIG. 9, FIG. 11 is an exploded perspective view of the gear disconnector of FIG. 10, and FIG. 12 is a drawing of the exploded gear disconnector of FIG. 11 seen from another direction. In addition, FIG. 13 is a drawing for explaining that an idler gear rotates when a dog tooth is separated from a dog groove in the gear disconnector of FIG. 9, and FIG. 14 is a drawing for explaining that an idler gear stops when a dog tooth is engaged with a dog groove in the gear disconnector of FIG. 13.

The gear shifter 260 is installed in the housing 210 and selectively rotates or stops the idler gear 253. The gear shifter 260 comprises: a plurality of dog grooves 261 formed in a cylindrical shape centered on the surface of the idler gear 253; a spline fixed shaft 262 which is fixed to the second housing 212 and has a rotation support groove 262a formed at the tip end thereof in which a rotation axis 253a of the idler gear 253 is rotatably supported; a detachable ring 263 which moves forward and backward while not rotating relative to the spline fixed shaft 262; a dog tooth 264 which is formed on the front surface of the detachable ring 263 and is detachable from the dog groove 261, and a selector 265 that moves the detachable ring 263 forward and backward so that the dog tooth 264 is coupled to or separated from the dog home 261.

The dog groove 261 is formed on the surface of the idler gear 253 and fixes the idler gear 253 when the dog teeth 264 are engaged. This dog groove 261 is in the form of a long hole, so that when the idler gear 253 rotates slightly, the dog teeth 264 are easily engaged and combined, thereby causing the idler gear 253 to come to a complete stop.

Spline grooves 262b, 263b that are mutually slidably engaged are formed on the outer surface of the spline fixed shaft 262 and the inner surface of the detachable ring 263, and thus the detachable ring 263 is non-rotatably coupled with respect to the spline fixed shaft 262 and can move forward and backward at the same time. As illustrated in FIG. 6, the spline fixed shaft 262 is fixed to the shaft engaging recess 212e formed in the second housing 212, and thus the detachable ring 263 that is spline-coupled is non-rotatably engaged.

The detachable ring 263 includes a mover cap 263a that rotates while remaining connected to the selector 265. The mover cap 263a has a circular cross-section and a ring groove 263c is formed on the outer surface.

The selector 265 includes a Y fork 266 having a pair of fork projections 266c formed at one end to fit into a ring groove 263c of a mover cap 263a, a lever shaft 267 formed at a fork lever 266b of the Y fork 266 and supported by a lever shaft support wing 212f (see FIG. 6) formed at a second housing 212, a fork bearing 268 installed at an end of the fork lever 266b, and an operating rod 269 coupled to the fork bearing 268 and fitted into a rod hole 212g (see FIG. 6) of the second housing 212 and protruding outward from the housing 210.

The fork projection 266c formed on the Y fork 266 is fitted into the detachable ring 263a formed on the mover cap 263a. Since the ring groove 263c has a circular cross-section, the fork projection 266c remains coupled to the ring groove 263c even while the detachable ring 263 rotates.

Since the lever shaft 267 is supported by the lever shaft support wing 212f formed in the second housing 212, when the Y fork 266 rotates around the lever shaft 267, the fork projection 266c moves the mover cap 263a forward or backward. The fork bearing 268 allows the operating rod 269 and the Y fork 266 to move three-dimensionally relative to each other.

The operating rod 269 is connected to the Y fork 266 by the fork bearing 268, and as shown in FIG. 6, protrudes outward through the rod hole 212g (see FIG. 6) of the second housing 212. The mover cap 253a moves forward and backward by the linear motion of the operating rod 269, and this operating rod 269 is operated by various types of linear motion controllers not shown, such as a solenoid, installed on the outside of the housing 210.

By pulling or pushing the operating rod 269 protruding outside the housing 210 by means of this gear shifter 260, the selector 265 moves the detachable ring 263 forward or backward toward the idler gear 253. When the detachable ring 263 moves forward, the dog teeth 264 engage with the dog groove 261 to fix the idler gear 253 so that it does not rotate, and when moving backward, the dog teeth 264 are separated from the dog groove 261 to allow the idler gear 253 to rotate.

That is, the gear shifter 260 can physically fix the idler gear 253 so that it does not rotate without using any additional electric energy, and accordingly, even if the power supplied to the second motor 230 is cut off, the rotational driving force of the first motor 220 can be prevented from being transmitted to the second motor 230 and dispersed.

Figure 15:
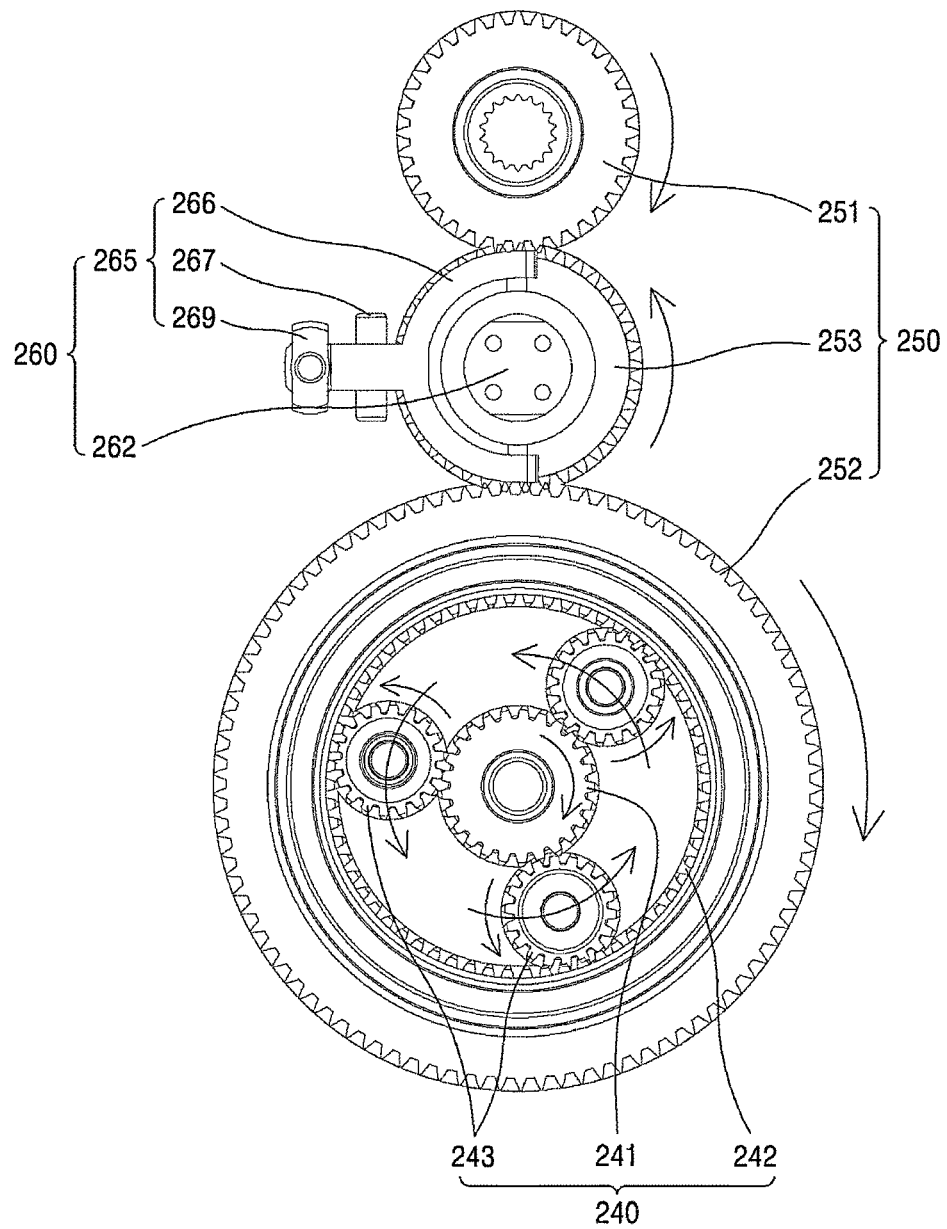
FIG. 15 is a drawing for explaining the operation of the continuously variable transmission drive system of FIG. 4.

FIG. 15 is a drawing for explaining the operation of the continuously variable transmission drive system of FIG. 4.

(a) When Driving on a General Road

The first and second motors 220, 230 are driven to rotate clockwise. In this case, the rotational driving force of the first motor 220 rotates the sun gear 241 clockwise through the first main input shaft 241a, and the carrier 244 coupled with the rotational shaft of the planetary gear 243 rotates in the same direction as the sun gear 241.

Meanwhile, the rotational driving force of the second motor 230 is directly transmitted to the outer ring gear 252 through the sub-driving gear 251 and the idler gear 253 to rotate the outer ring gear 252 in the same direction as the sun gear 241. Accordingly, the rotational driving force applied to the outer ring gear 252 is applied so that the inner ring gear 242 rotates the carrier 244 axially coupled with the planetary gear 243 in the same direction, and as a result, the rotational driving force generated by the first motor 220 and the second motor 230, i.e., torque and speed, is added together and applied to the output shaft 244a, and accordingly, the output shaft 244a drives the electric vehicle with a large torque force. That is, the output shaft 244a drives the electric vehicle by changing the torque of the two first and second motors 220, 230 in accordance with road conditions.

(b) when Driving on a Road with an Upward Slope

By increasing the power applied to the first and second motors 220. 230, a large torque is generated. In this case, the torque and speed of the first and second motors 220230 are added and applied to the output shaft 244a, so that the electric vehicle can drive with a large power even on a road that is inclined upward.

(c) when You want to Increase Speed while Driving

The rotation speed of the first motor 220 is increased to rapidly rotate the carrier 244 coupled with the planetary gear 243, and the rotation speed of the second motor 230 is simultaneously increased to rapidly rotate the outer ring gear 252 and rapidly rotate the planetary gear 243. Then, the outer ring gear 252 and the inner ring gear 242 rapidly rotate the carrier 244 coupled with the planetary gear 243, thereby increasing the rotation speed of the output shaft 244a, and the electric vehicle can run at high speed by using the optimal speed and current of the first and second motors 220, 230.

Or, while the first motor 220 is constantly rotated, the rotation speed of the second motor 230 is increased to quickly rotate the outer ring gear 252. Then, the outer ring gear 252 and the inner ring gear 242 quickly rotate the carrier 244 that is axially coupled with the planetary gear 243, thereby increasing the rotation speed of the output shaft 244a, and the electric vehicle can run at high speed. That is, the rotation speeds of the first and second motors 220 230 are simultaneously and independently increased, and the torque of the output shaft 244a for the speeds of the two motors is created to a torque suitable for the road environment and then changed to increase the rotation speed.

(d) when You want to Reduce the Speed while Driving

The rotation speed of the first motor 220 is reduced to relatively slowly rotate the carrier 244 coupled with the planetary gear 243, and the rotation speed of the second motor 230 is reduced to relatively slowly rotate the outer ring gear 252 around the planetary gear 243. Then, the outer ring gear 252 and the inner ring gear 242 relatively slowly rotate the carrier 244, thereby reducing the rotation speed of the output shaft 244a. Accordingly, the electric vehicle while running is shifted to a low speed.

(e) when Stopping Slowly while Driving

When the rotation speeds of the first motor 220 and the second motor 230 are slowly reduced, a high torque is generated, and the outer ring gear 252 and the inner ring gear 242 come to a standstill and gradually stop. Alternatively, when one of the first motor 220 and the second motor 230 is rotated in reverse so that the rotation speeds of the inner ring gear 242 and the carrier 244, which rotate in opposite directions, become the same, the rotation of the output shaft 244a stops, and the driving can be stopped.

(f) Backward Driving

When the rotation direction of the first and second electric motors 220, 230 is reversed, the rotation direction of the output shaft 244a becomes reversed and the electric vehicle moves backward.

(g) Other

As mentioned above, the speed can be changed even while the electric vehicle is moving backwards. In addition, since the electric vehicle's gear change is practically infinitely variable, there is no shock when changing gears, which maximizes the stability while driving.

Figure 16:
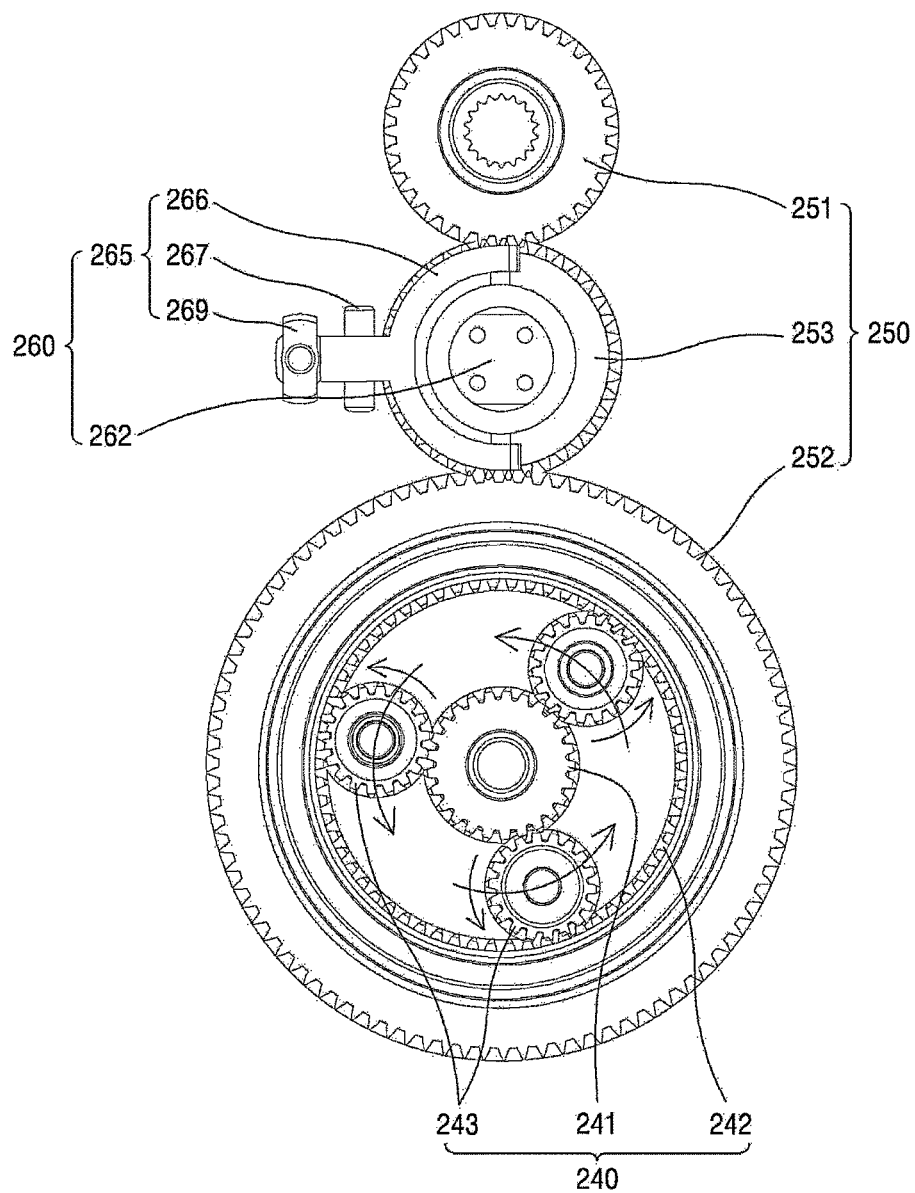
FIG. 16 is a drawing for explaining the operation of the continuously variable transmission drive system in a state where the gear selector in FIG. 15 fixes the rotation of the idler gear.

FIG. 16 is a drawing for explaining the operation of the continuously variable transmission drive system in a state where the gear selector in FIG. 15 fixes the rotation of the idler gear.

In order for an electric vehicle to drive long distances on a road with good driving conditions, such as a flat road or highway, the electric energy consumed must be reduced, and to this end, the power supplied to the second motor 230 must be cut off.

However, when the power applied to the second motor 230 is cut off, no load is applied to the rotational shaft of the second motor 230, so the rotational driving force of the first motor 220 is transmitted to the second motor 230 through the inner/outer ring gears 242, 252 and the idler gear 253, and the rotational shaft of the second motor 230 may run idle. In other words, the rotational driving force of the first motor 220 is dissipated to the second motor 230, and in this case, the torque value applied to the output shaft 244a is significantly reduced.

To prevent this, the gear shifter 260 stops the rotation of the idler gear 253 to prevent the rotational axis of the second motor 230 from running idle, that is, to prevent the rotational driving force from being transmitted between the outer ring gear 252 and the second motor 230.

In this way, the gear shifter 260 prevents the idler gear 253 from rotating, thereby preventing the rotational driving force of the first motor 220 from being dispersed to the second motor 230 even when the power supplied to the second motor 230 is completely cut off. Accordingly, the electric vehicle according to the invention can drive in various ways as well as on the road. That is, when power cutoff is required during driving, such as forward, backward, or downhill, the rotation of the second motor 230 is physically cut off, thereby using electric energy only to drive the first motor 220, thereby improving driving performance and energy efficiency.

In this way, according to the present invention, the rotation speed and torque value at the output shaft 244a can be freely varied by the organic coupling relationship between the first and second motors 220, 230 and the first and second gear assemblies 240, 250, and accordingly, the electric vehicle can be driven at low or high speed on a general road, the electric vehicle can be driven at high torque on a steep road, and a continuously variable gear shift without any gear shift shock is possible.

In addition, the gear shifter 260 can physically fix the idler gear 253 so that it does not rotate, and in this case, when the power supplied to the second motor 230 is cut off, the electric energy only operates the first motor 220, which results in the relatively extended driving distance of the electric vehicle.

In addition, by using the first and second motors 220230 with smaller output than the single motor used in conventional electric vehicles, the size and weight of the continuously variable transmission drive system 200 can be reduced, thereby making it possible to reduce the weight of the electric vehicle and further reduce the electric energy consumed.

And by increasing the speed by using two motors, the electric energy consumed by the electric vehicle can be further reduced by using only the optimal torque, that is, the optimal current, of the first and second motors 220, 230 even at high speeds.

Although the present invention has been described with reference to one embodiment shown in the drawings, this is merely exemplary, and those skilled in the art will understand that various modifications and equivalent other embodiments are possible therefrom.

The invention claimed is:

1. A continuously variable transmission drive system for an electric vehicle which is installed in a chassis (100) having wheels (110), (120) at the front and rear and supplies rotational driving force to the wheels by power supplied from a battery, comprising: a housing (210) fixed to the chassis (100); a first motor (220) installed on one side of the housing (210) and supplying rotational driving force; a second motor (230) installed on the other side of the housing (210) and supplying rotational driving force; a first gear assembly (240) including a sun gear (241) built into the housing (210) and having a main input shaft (241a) connected to the rotational shaft of the first motor (220), an inner ring gear (242) arranged to surround the sun gear (241) in a circumferential direction, a plurality of planetary gears (243) arranged between the sun gear (241) and the inner ring gear (242), and a carrier (244) having an output shaft (244a) protruding outward from the housing (210) on the opposite side of the main input shaft (241a) and connected to the rotational shafts of the plurality of planetary gears (243); and a second gear assembly (250) including a sub-drive gear (251) built into the housing (210) and having a sub-input shaft (251a) connected to the rotational axis of the second motor (230), an outer ring gear (252) forming one body with the outer side of the inner ring gear (242), and an idler gear (253) arranged between the outer ring gear (252) and the sub-drive gear (251) and transmitting the rotational driving force of the second motor (230) to the outer ring gear (252), and a gear shifter (260) is further included, which is installed in the housing (210) and selectively rotates or stops the rotation of the idler gear (253), wherein the gear shifter (260) includes: a plurality of dog grooves (261) formed in a cylindrical shape centered on the surface of the idler gear (253); a spline fixed shaft (262) which is fixed to the second housing (212) and has a rotation support groove (262a) formed at the tip thereof in which a rotation axis (253a) of the idler gear (253) is rotatably supported; a detachable ring (263) which moves forward and backward while not rotating relative to the spline fixed shaft (262); a dog tooth (264) formed on the front surface of the detachable ring (263) and which is detachable from the dog groove (261); and a selector (265) which moves the detachable ring (263) forward and backward so that the dog tooth (264) is coupled to or detached from the dog groove (261).

2. A continuously variable transmission drive system for an electric vehicle of claim 1, wherein the detachable ring (263) further includes a mover cap (263a) that rotates while maintaining a state of being connected to the selector (265).

3. A continuously variable transmission drive system for an electric vehicle of claim 2, wherein the selector (265) includes a Y fork (266) having a pair of fork projections (266c) formed at one end to fit into a ring groove (263c) of the mover cap (263a), a lever shaft (267) formed at a fork lever (266b) of the Y fork (266) and supported by a lever shaft support wing (212f) formed at the second housing (212), a fork bearing (268) installed at an end of the fork lever (266b), and an operating rod (269) coupled to the fork bearing (268) and fit into a rod hole (212g) of the second housing (212) and protruding outward from the housing (210).

4. A continuously variable transmission drive system for an electric vehicle of claim 1, wherein the housing (210) includes a first housing (211) and a second housing (212) that are coupled to each other; the first and second housings (211), (212) have first and second inner fitting recesses (211a), (212a) formed on the lower side of the inner surface facing each other and into which the first and second inner bearings (245), (246) of the first gear assembly (240) are fitted, first and second outer fitting recesses (211b), (212b) formed on the outer side of the first and second inner fitting recesses (211a), (212a) and into which the outer bearings (247) of the first gear assembly (240) are fitted, and an upper fitting recess (211c), (212c) formed on the upper side and into which the upper bearing (256) of the second gear assembly (250) is fitted; wherein, a shaft coupling recess (212e) to which the spline fixing shaft (262) of the gear shifter (260) is fixed, a pair of lever shaft support wings (212f) on which the lever shaft (267) of the gear shifter (260) is supported, and a rod hole (212g) formed between the pair of lever shaft support wings (212f) and into which the operating rod (269) of the gear shifter (260) is fitted so as to be able to move forward and backward are formed between the upper fitting recess (212c) and the second outer fitting recess (211b) in the second housing (212).

\* \* \* \* \*